United States Patent
Sue et al.

(10) Patent No.: US 12,426,357 B2
(45) Date of Patent: Sep. 23, 2025

(54) INTEGRATED CIRCUIT HAVING FINS CROSSING CELL BOUNDARY

(71) Applicant: TAIWAN SEMICONDUCTOR MANUFACTURING COMPANY, LTD., Hsinchu (TW)

(72) Inventors: Pin-Dai Sue, Hsinchu (TW); Ting-Wei Chiang, Hsinchu (TW); Hui-Zhong Zhuang, Hsinchu (TW); Ya-Chi Chou, Hsinchu (TW); Chi-Yu Lu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 99 days.

(21) Appl. No.: 17/871,239

(22) Filed: Jul. 22, 2022

(65) Prior Publication Data

US 2022/0359508 A1    Nov. 10, 2022

Related U.S. Application Data

(62) Division of application No. 16/837,497, filed on Apr. 1, 2020, now Pat. No. 11,935,888.

(51) Int. Cl.
| | | |
|---|---|---|
| H01L 29/66 | (2006.01) | |
| G06F 30/367 | (2020.01) | |
| G06F 30/392 | (2020.01) | |
| H01L 21/8234 | (2006.01) | |
| H01L 27/088 | (2006.01) | |
| H01L 29/78 | (2006.01) | |
| H10D 84/01 | (2025.01) | |
| H10D 84/03 | (2025.01) | |
| H10D 84/83 | (2025.01) | |
| G06F 119/06 | (2020.01) | |

(52) U.S. Cl.
CPC ........ *H10D 84/834* (2025.01); *G06F 30/367* (2020.01); *G06F 30/392* (2020.01); *H10D 84/0135* (2025.01); *H10D 84/0151* (2025.01); *H10D 84/0158* (2025.01); *H10D 84/038* (2025.01); *G06F 2119/06* (2020.01)

(58) Field of Classification Search
CPC ......... H01L 21/823431; H01L 27/0924; H01L 29/66795; G06F 30/30; G06F 2119/06
See application file for complete search history.

(56) References Cited

U.S. PATENT DOCUMENTS

| | | |
|---|---|---|
| 7,260,442 B2 | 8/2007 | Hwang et al. |
| 9,256,709 B2 | 2/2016 | Yu et al. |
| 2010/0050139 A1 * | 2/2010 | Abadir .................... G06F 30/30 716/106 |

(Continued)

*Primary Examiner* — Kyoung Lee
*Assistant Examiner* — David J Goodwin
(74) *Attorney, Agent, or Firm* — Hauptman Ham, LLP

(57) ABSTRACT

A method of making an integrated circuit includes steps of selecting a first cell and a second cell for an integrated circuit layout from a cell library in an electronic design automation (EDA) system, the first and second cells each having a cell active area, a cell gate electrode, at least one fin of a first set of fins, and a cell border region, each cell also having the active area at an exposed side, and placing the first exposed side against the second exposed side at a cell border. The method also includes operations of aligning at least one fin of the first set of fins with at least one fin of the second set of fins across a cell border.

20 Claims, 12 Drawing Sheets

(56) References Cited

U.S. PATENT DOCUMENTS

| | | |
|---|---|---|
| 2014/0040838 A1 | 2/2014 | Liu et al. |
| 2015/0278429 A1 | 10/2015 | Chang |
| 2018/0286884 A1* | 10/2018 | Liaw ................. H01L 27/11807 |
| 2019/0067097 A1* | 2/2019 | Wang ..................... H01L 22/20 |
| 2019/0096870 A1 | 3/2019 | Liaw |
| 2019/0131303 A1 | 5/2019 | Yoshitani |
| 2019/0164971 A1* | 5/2019 | Liaw ............... H01L 21/823864 |

* cited by examiner

INTEGRATED CIRCUIT HAVING FINS CROSSING CELL BOUNDARY

PRIORITY STATEMENT

This application is a divisional application of U.S. patent application Ser. No. 16/837,497, filed Apr. 1, 2020, now U.S. Pat. No. 11,935,888, issued Mar. 19, 2024, the contents of which are hereby incorporated by reference in their entirety.

BACKGROUND

Integrated circuit manufacturing methods include circuit (IC) design operations directed toward reducing cell area to increase the number of transistors and other circuit elements in an integrated circuit. Increased numbers of transistors and other circuit elements increases the integrated circuit functionality and is associated with a decreased manufacturing cost per transistor. IC design operations include cell area measurement operations, as well as interconnection structure wire routing adjustments.

IC design operations to decrease the area of an integrated circuit are limited by the area of cells for transistors and other circuit elements on a substrate. When cells in a layout are brought into direct contact, further changes to the integrated circuit layout at layers above the substrate do not further reduce the area of the integrated circuit.

DETAILED DESCRIPTION

Figure 1:
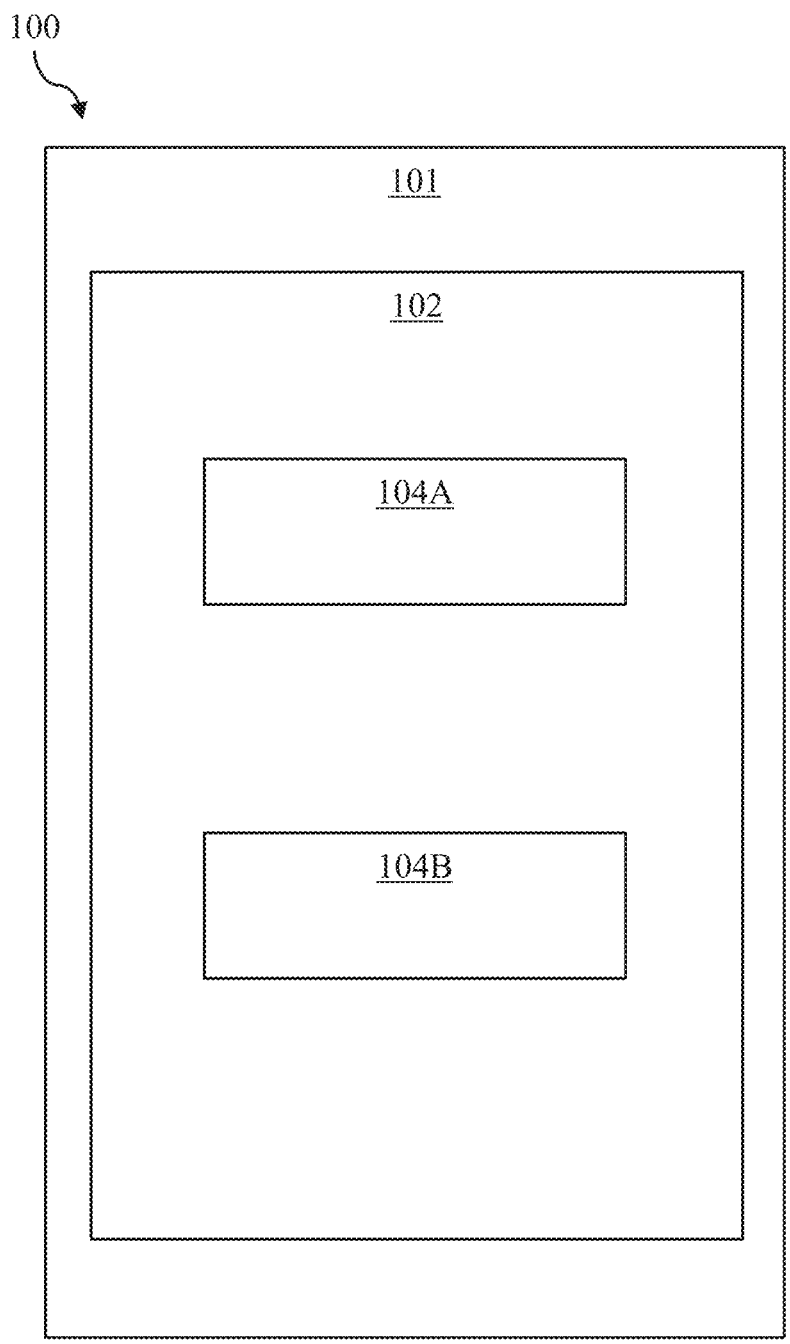
FIG. 1 is a block diagram of a semiconductor device, in accordance with at least one embodiment of the present disclosure.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Integrated circuit layouts take into account evaluations of the space between elements of the integrated circuit when determining whether the layout is to be generated. Integrated circuit layouts are selected to decrease the space between cells of the integrated circuit and increase the number of cells which are incorporated in a same size area of the semiconductor wafer. However, reducing inter-cell spacing increases the influence between circuit elements, such as cross-talk and leakage current. Managing power loss due to leakage current is a design consideration, especially for transistors having channel lengths smaller than 14 nanometers (nm).

Elements of an integrated circuit are isolated from each other by increasing the space between circuit elements, or by adding elements to the circuit design to decrease leakage current. Decreased leakage current decreases total power consumption of an integrated circuit and extends battery life of portable semiconductor devices. At a transistor layer of the integrated circuit, the strength of the magnetic or electrical fields exerted on neighboring cells of an integrated circuit is reduced by increasing the space between cells (or, e.g., the transistors in cells) of the integrated circuit. Additional space between transistors, however, increases the overall cell area, decreasing the overall number of transistors which fit onto a substrate during a manufacturing process.

FIG. 1 is a block diagram of a semiconductor device 100 in accordance with at least one embodiment of the present disclosure. In FIG. 1, semiconductor device 100 includes, among other things, an integrated circuit 101 having therein a circuit macro (hereinafter, macro) 102. In some embodiments, macro 102 is a transistor. In some embodiments, macro 102 is a macro other than a transistor macro. Macro 102 includes, among other things, a first arrangement 104A and a second arrangement 104B. Example of layout diagrams resulting in arrangements 104A and 104B include the diagrams in each of each of FIGS. 3-9. In some embodiments, first arrangement 104A and second arrangement 104B include circuit elements such as implant wells and fins of a transistor. Implant wells are regions of a semiconductor substrate to which have been added dopant atoms to reduce leakage current and/or cross-talk between transistors in adjacent cells of an integrated circuit. Fins of an integrated circuit cell are in an upper portion of the semiconductor substrate. Implant wells are in a lower portion of the semiconductor substrate. In some embodiments, an implant well is below an entirety of a fin. In some embodiments, a lower portion of a fin includes an upper portion of the implant well (e.g., the fins are cut or etched to be sufficiently tall that the lower portion of the fin includes an upper portion of an implanted region of the semiconductor substrate, where the implanted region was formed in a previous manufacturing operation).

In some embodiments, before making an integrated circuit layout, active areas of some of the cells of a standard cell library are laterally surrounded on all four sides by substrate material. In some embodiments, before making an integrated circuit layout, active areas of some of the cells of the integrated circuit cell library are laterally surrounded on all four sides by a doped well, the well also extending below the active area. In some embodiments, an integrated circuit layout includes cells with active areas in direct contact with the active area of an adjacent or adjoining cell.

Figure 2A:
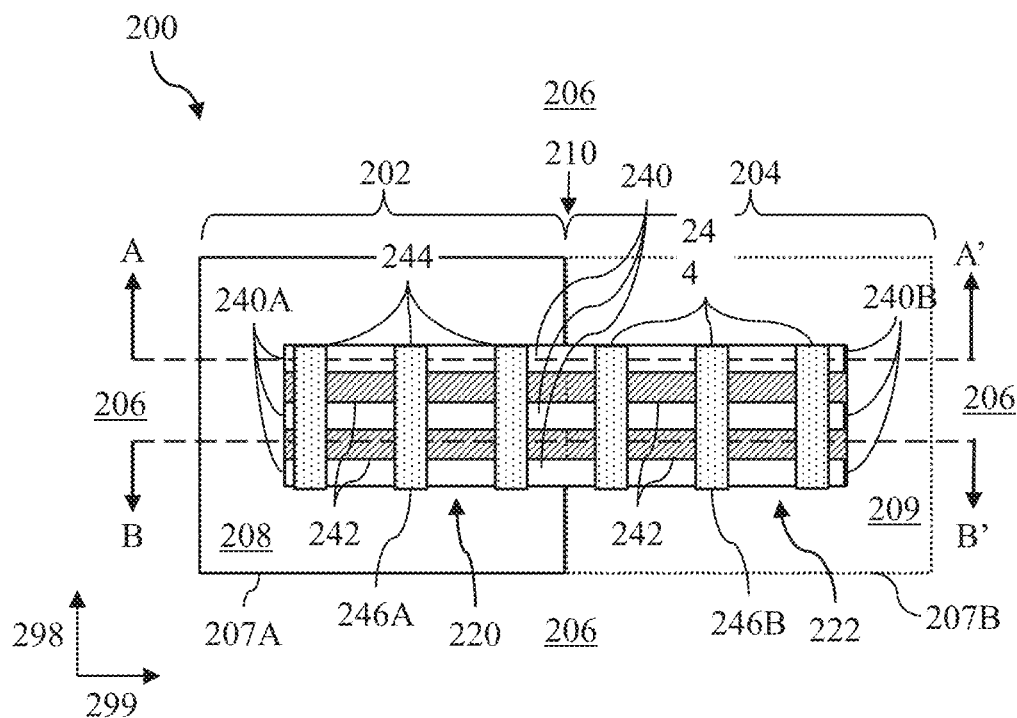
FIG. 2A is a top view of an integrated circuit, in accordance with some embodiments.

FIG. 2A is a top view of an integrated circuit 200, in accordance with some embodiments. Integrated circuit 200 includes a first cell 202 and a second cell 204. Integrated circuit 200 is in a substrate 206. First cell 202 includes a well 208 in substrate 206. Second cell 204 does not include a well. Fins 240 extend from first cell 202 across cell boundary 210 into second cell 204. Fins 240 are divided into fin portions 240A in first cell 202 and fin portions 240B in second cell 204. First cell 202 includes at least one fin portion 240A in a first cell active area 220. Second cell 204 includes, in a second cell active area 222, at least one fin portion 240B. The number of fins in the first cell active area 220 and the second cell active area 222 is a same number of fins. In some embodiments, the second cell active area contains a different number of fins than the first cell active area. Cell boundary 210 between first cell 202 and second cell 204 extends in a first direction 298 perpendicular to a second direction 299. Fins portions 240A of the first cell 202 and fin portions 240B of the second cell 204 have a long dimension in the second direction 299. First cell active area 220 directly contacts second cell active area 222 at the cell boundary 210. Fins 240 extend across cell boundary 210 in a continuous manner.

Fins 240 are a semiconductor material. In integrated circuit 200, the fin semiconductor material is the same semiconductor material as substrate 206. In some embodiments, the semiconductor material is a different semiconductor material than substrate 206. In some integrated circuits, a substrate includes a semiconductor material lightly doped with a P-type dopant. In some embodiments of integrated circuits, leakage current is reduced by increasing a separation distance between cells of the integrated circuit. Undoped, or lightly doped, substrate material inhibits a flow of electrical current through the substrate because the resistance of the substrate material increases with greater distances for current to flow through the lightly doped or undoped substrate material.

In a top view, first cell active area 220 is surrounded on three sides by a first border region 207A. In a top view, second cell active area 222 is surrounded on three sides by a second border region 207B. In first cell 202, the first border region 207A is a well 208 surrounds first cell active area 220 on three sides (in the first direction 298 and the second direction 299) and extends below first cell active area 220 (see well 208 in FIGS. 2B and 2C). Well 208 is a doped semiconductor material. Some transistors in an integrated circuit include wells in order to reduce leakage current from a source of the cell to other cells, or to other structures in a substrate. In some embodiments, well 208 contains an opposite dopant type than the dopant in a substrate of the integrated circuit. For example, in a non-limiting embodiment, the substrate is a P-doped substrate and the well is an N-doped well. In some embodiments, the dopant in the well is the same type as the substrate of the integrated circuit. A dopant in well 208 is used to reduce leakage current between cells, or between a cell and other circuit elements, of the integrated circuit through the substrate.

In second cell 204, the second border region 207B is a buffer region 209. Buffer region 209 is an area of substrate without modification (e.g., no added dopants, and so forth) which provides thermal and/or electrical isolation between the second cell active area and an integrated circuit element in a cell other than first cell 202. Second border region 207B (e.g., buffer region 209) extends around the sides and below the second cell active region 222 (see border region 207B in FIGS. 2B and 2C).

In first cell 202, the fins 240A are separated from each other by insulating material by an insulating material 242. Insulating material in a cell is, in some embodiments, a dielectric material deposited by, e.g., chemical vapor deposition (CVD), or some other method of growing or depositing material in the trenches between fins of the integrated circuit active area. Fins 240A extend in the second direction 299. Insulating material 242 also extends in the second direction 299, because the insulating material lines the sides of the fins 240A. In some embodiments, the insulating material is a single layer of a dielectric material extending along an entire sidewall of the fins of the active areas. In some embodiments, the insulating material includes at least two layers of dielectric material extending along the sidewall of the fins of the active areas (see insulating material 242 and insulating material 249, in FIG. 2C).

Figure 2B:
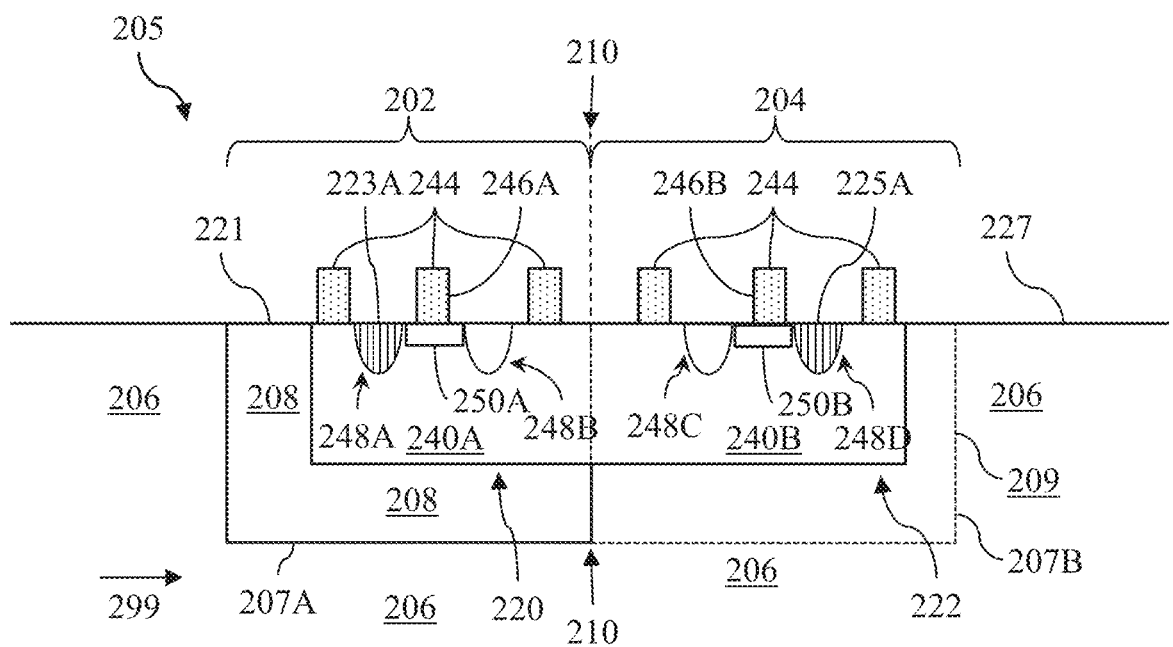
FIGS. 2B-2C are cross-sectional views of an integrated circuit, in accordance with some embodiments.
Figure 2C:
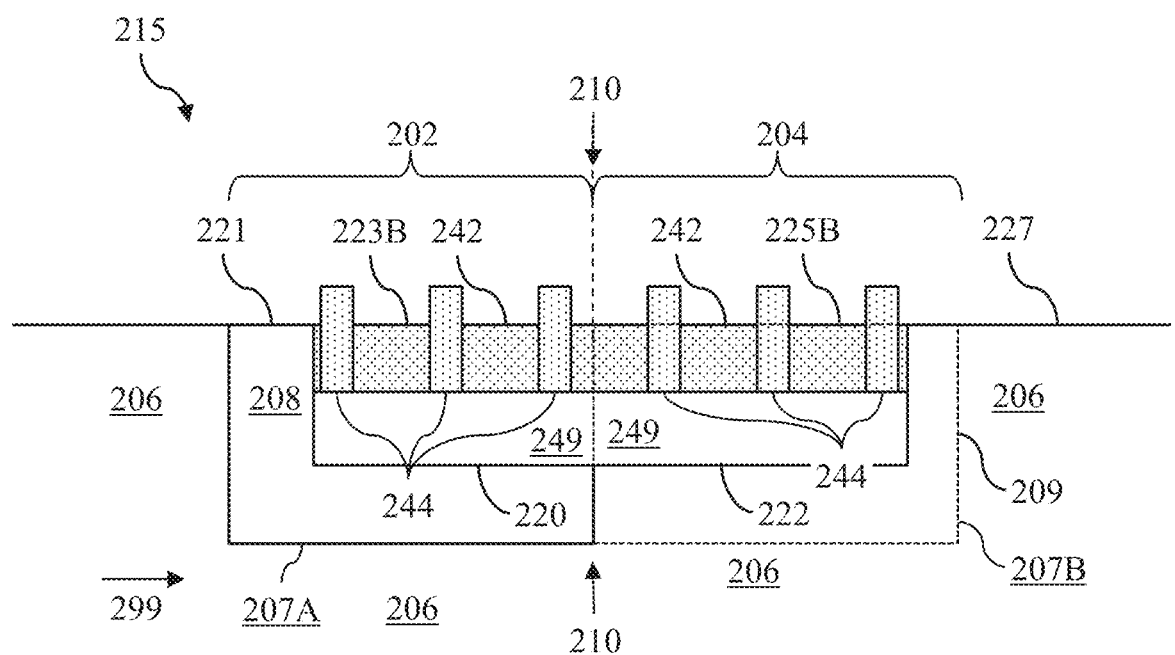

In FIG. 2A, a first cross-sectional line A-A' extends in second direction 299 across first cell active area 220 and second cell active area 222 through a fin (fin portion 240A and fin portion 240B). FIG. 2B is a cross-sectional view along cross-sectional line A-A'. Cross-sectional line B-B' extends parallel to first cross-sectional line A-A' in the second direction 299 through an insulating material (insulating material 242). FIG. 2C is a cross-sectional view along cross-sectional line B-B'. In integrated circuit 200, poly lines 244 extend over fins 240A and 240B, and over insulating material 242. Poly line 246A is a gate electrode for first cell 202, and poly line 246B is a gate electrode for second cell 204. Although, in the present disclosure gate electrodes are described as poly lines, other materials are also contemplated within the scope of the present disclosure. For instance, in some embodiments a gate electrode is an undoped semiconductor material. In some embodiments, a gate electrode is a dual-material circuit element, where the upper portion of the gate electrode is a metal silicide and the lower portion of the gate electrode is an undoped semiconductor material, or a doped semiconductor material. In some embodiments, the gate electrode is a conductive material, such as metal. In some embodiments, the gate electrode is another material such as a metal alloy. For purposes of this embodiment, the term "poly" is used to indicate a doped polysilicon material which is deposited over a gate dielectric layer to form a gate electrode.

FIG. 2B is a cross-sectional view of an integrated circuit 205, in accordance with some embodiments. The cross-sectional view of integrated circuit 205 corresponds to integrated circuit 200 along cross-sectional line A-A'. Elements of integrated circuit 205 which resemble elements of integrated circuit 200 are given a same reference numeral. A person of ordinary skill in the art will recognize that integrated circuit 205 in FIG. 2B is non-limiting, and that other embodiments of an integrated circuit and an IC layout are also within the scope of the present disclosure.

Integrated circuit 205 has a substrate 206 and a well 208 embedded therein. Well 208 extends below fin portion 240A of first cell 202 in the first cell active area 220. Well 208 also extends to the top surface of the substrate 206 along a sidewall of fin portion 240A. Fin portion 240B in second cell active area 222 meets, and is physically continuous with, fin portion 240A of first cell active area 220. Fin portion 240A transitions to become fin portion 240B at cell boundary 210. Fin portion 240A includes source/drain regions 248A and 248B, and fin portion 240B includes source/drain regions 248C and 248D. The source/drain regions are located between adjacent poly lines 244.

Fin top surface 223A of fin portion 240A, and fin top surface 225A of fin portion 240B are substantially coplanar. Fin top surface 223A and fin top surface 225A are substantially planar with well top surface 221 of well 208, and with the substrate top surface 227 of substrate 206. Source/drain regions 248B and 248C are a same type (source or drain) of region. Source/drain regions 248A and 248D are a same type of region, different from source/drain regions 248B and 248C. In some embodiments, source/drain regions 248B and 248C are source regions, and source/drain regions 248A and 248D are drain regions. In some embodiments, source/drain regions 248B and 248C are drain regions, and source/drain regions 248A and 248d are source regions.

Source/drain regions 248A-D are formed by adding dopant atoms to the fin (fins 240A and 240B) that cell boundary 210. In some embodiments, dopant atoms are added to material of a fin by implanting dopant atoms from a source of ionized atoms. In some embodiments, dopant atoms are added to material of a fin by depositing a layer of dopant material over the portion of a fin corresponding to the source/drain region and annealing the integrated circuit to migrate the deposited material into the material of the fin. In some embodiments, the dopants are added to the fin as part of an epitaxial process used to grow the source/drain regions 248A-D. In some embodiments, a top surface of at least one source/drain region 248A-D extends above substrate top surface 227.

Poly lines 244 are against the fin top surface 223A and fin top surface 225A. Poly lines 244 extend over the top of fins 240A and 240B (and, as described in FIG. 2C, at least part of the fin sidewalls). Poly line 246A is a gate electrode for first cell 202, and poly line 246B is a gate electrode for second cell 204. Poly line 246A is directly over a first cell channel 250A. Poly line 246B is directly over a second cell channel 250B.

FIG. 2C is a cross sectional view of an integrated circuit 215, in accordance with some embodiments. The cross-sectional view of integrated circuit 215 corresponds to integrated circuit 200 along cross-sectional line B-B'. Elements of integrated circuit 215 which resemble elements of integrated circuit 200 are given a same reference numeral. A person of ordinary skill in the art will recognize that the integrated circuit 215 in FIG. 2C is non-limiting, and that other embodiments of an integrated circuit and an IC layout are also within the scope of the present disclosure.

Integrated circuit 215 has a first cell 202 and a second cell 204, and a substrate 206. First cell is surrounded on three sides, and below, by a border region 207A. Second cell is surrounded on three sides, and below, by a border region 207B. Border region 207A is a doped well 208 formed by doping the substrate 206. Border region 207B is a buffer region 209, which includes undoped substrate material. Border region 207A and border region 207B meet at cell boundary 210.

Insulating material 249 fills a lower portion of a volume next to fins 240A and fins 240B (not shown in FIG. 2C but see FIG. 2B). Poly lines 244 extend from above the insulating material top surface 223B (in first cell 202) and insulating material top surface 225B (in second cell 204) down to insulating material 249. Insulating material 242 is an insulating material on a top surface of insulating material 249. Poly lines 244 extend from above the top surface of the insulating material 242, downward in the space between fins of the cell active areas. In integrated circuit 215, poly lines 244 extend partially along sidewalls of the fins and insulating material 249 fills an entirety of the lower volume of the space next to the fins.

Insulating material 249 and insulating material 242 are dielectric materials deposited into the spaces between the fins. In some embodiments, the dielectric materials include silicon dioxide, silicon oxy-nitride, or other dielectric materials suitable for deposition onto a transistor structure or around source/drain surfaces or gate electrodes of a transistor. Insulating materials are deposited by, e.g., chemical vapor deposition or other suitable techniques for depositing insulating materials. In some embodiments, the insulating material is deposited to completely cover the fins, and then etched back to expose the top surface of the substrate 206 and the upper portions of the fins, leaving a lower portion of the fins insulated from each other by the remaining portion of insulating material between the lower portions.

In some embodiments, the poly lines 244 extend along the entire height of a fin, to a bottom of a volume between or next to fins of the active areas. In some embodiments when fins extend vertically along the entire height of the fin, the insulating material 242 between fins 240 extends vertically along the entire height of the fin, to a bottom of the volume between or next to the fins of the active areas.

Figure 3:
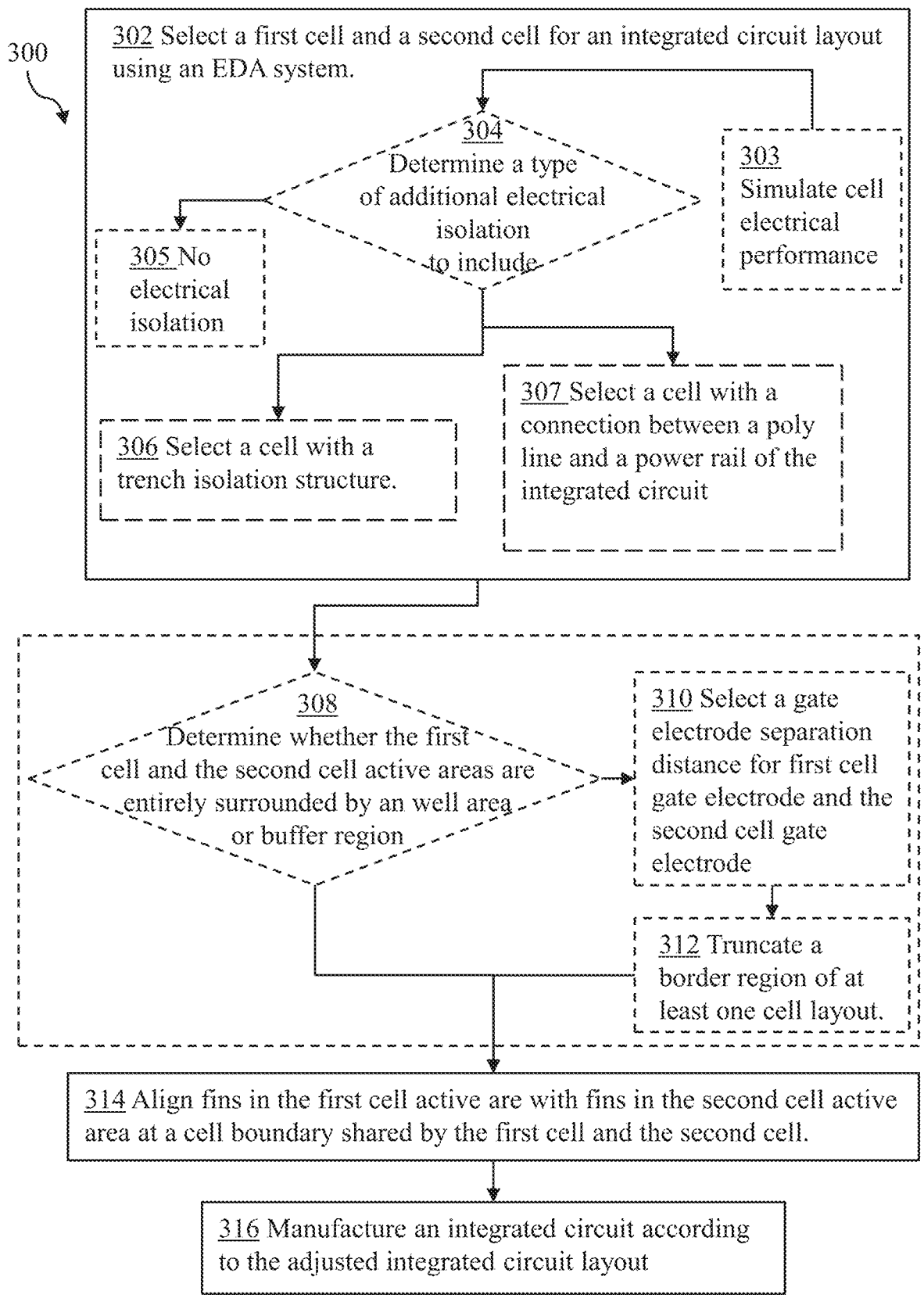
FIG. 3 is a flow diagram of a method of modifying an integrated circuit layout, in accordance with some embodiments.

FIG. 3 is a flow diagram of a method making an integrated circuit layout, in accordance with some embodiments.

In an operation 302, a first cell and a second cell are selected for an integrated circuit layout using an EDA system, as described below in FIG. 10. According to some embodiments, the first cell and the second cell are selected from a standard cell library before arrangement in an integrated circuit layout. In some embodiments, the first cell and the second cell are selected from a library of integrated circuit cells having border regions (wells or buffer regions) which surround only three sides of the active area of the cells (leaving the active area "exposed" at one cell border. The first cell includes a first active area, a first gate electrode, and a border region around the first active area. A second cell includes a second active area, a second gate electrode, and a border region around the second active area. As described above, in some embodiments, the border region is a well region in a substrate of an integrated circuit. As described above, in some embodiments, the border region is a buffer region of a substrate around the active area, with no dopants added to the substrate around the active area of the cell. In some embodiments, the border region is a portion of dielectric material which surrounds the active area at three sides, leaving the active area "exposed" along one cell border. In some embodiments, (such as, e.g., a silicon on insulator integrated circuit), the dielectric material also surrounds the bottom of an active area to insulate the active area from the substrate.

In some embodiments, operation 302 includes an operation 303, the electrical performance of combinations of the possible first cells and second cells is simulated in prior to making the selection of the first cell and the second Cell. In some embodiments, the electrical performance of combinations of cells includes evaluating switching speed and/or leakage current between the active areas of the cells. Simulation of electrical performance of combinations of cells from a cell library is performed, in some embodiments, by the EDA system software further described in FIG. 10, below. In some embodiments, leakage current or other electrical parameters of combinations of cells are simulated in a circuit modeling program, and the performance parameters are stored in an EDA system software prior to making the cell selection for the integrated circuit layout.

In some embodiments, when the leakage current or some other electrical parameter exceeds a design specification, the cell selection process is repeated to include standard cells which have structures for reducing leakage current located in the cells. In some embodiments, based on space or process considerations, the method includes an operation 304, in which a type of leakage current reduction structure is selected for inclusion in the integrated circuit layout. The determination includes at least an operation selected from operation 305, operation 306, and operation 307, as described below.

In an operation 305, the determination is to include no electrical isolation structure in the first cell or the second cell during the cell selection operation 302. In an operation 306, the inner poly line of at least one cell is replaced with a trench isolation structure which cuts through the fins of a cell where the trench isolation structure is located. In an operation 307, a poly line between the first gate electrode and the second gate electrode is electrically connected, by a via or other interconnection structure, to a power rail or other voltage source, or ground, of the integrated circuit. By connecting the poly line between gate electrodes in adjacent cells (e.g., having active areas which meet at the cell border shared by the cells) to a voltage source, the electrical potential applied to the poly line repels the electrons in a region of the fin (e.g., the source or drain region closest to the poly line) from the portion of the fin below or adjacent to the poly line. The charge carriers are repelled from the cell border, reducing or eliminating leakage current across the cell border.

In some embodiments of operation 307, the power rail is a $V_{dd}$ power rail. In some embodiments, the power rail is a $V_{ss}$ power rail. By connecting the power rail of the integrated circuit to the inner poly lines of the first cell and the second cell, the inner poly lines bias the at least one fin between the first cell gate electrode and the second cell gate electrode to reduce leakage current through the fin between the gate electrodes. In some embodiments, the poly lines between the gate electrodes in the first cell and the second cell also apply a bias to the substrate outside the first cell active area and the second cell active area. In some embodiments, biasing the at least one fin between the cells decreases the amount and/or likelihood of leakage current because the conductive path is longer than in an integrated circuit wherein there is no bias between the gate electrodes. However, biasing the fins and/or substrate is less effective at reducing leakage current (especially for smaller device dimensions) than cutting the at least one active area fin in the first cell and the second cell with at least one trench isolation structure. An integrated circuit with a trench isolation structure takes additional time and cost to manufacture because of the additional process steps and is associated with an increase in the number of defects on the integrated circuit die, reducing yield and/or functional performance of the device.

In some embodiments, cells selected for the integrated circuit layout include different numbers of fins extending cross the cell. In some embodiments, cells selected for the integrated circuit include a same number of fins extending across the cell. A feature of the first cell and the second cell is the fins of each of the first cell and the second cell have a same fin pitch, (or, fin separation distance, or fin separation interval) in a first direction perpendicular to the longitudinal axis of the fins).

In an operation 308, a determination is made as to whether the first cell and the second cell active areas of the first cell and the second cell selected in operation 302, are entirely surrounded by a border region. In an embodiment where the active area of the first cell, or the second cell, is entirely surrounded by a border region, the method proceeds to an operation 310. In an embodiment where the active area of the first cell, or the second cell is not entirely surrounded by a border region, the method proceeds to an operation 314.

In an operation 310, the integrated circuit layout is evaluated to select a gate electrode separation distance between the first gate electrode of the first cell and the second gate electrode of the second cell. The gate electrode separation distance is selected based on a design specification of the integrated circuit, and/or the presence of leakage current reduction structures in the selected cells. Gate electrode separation distances are based on poly line pitch interval of the cells in the integrated circuit. A poly line pitch interval is a separation distance between poly lines of the cells of the integrated circuit (e.g., the separation distance between a selected gate electrode and a closest possible position for a poly line in the same cell as the selected gate electrode). In a non-limiting example, the gate electrode separation distance is selected to be one poly line pitch interval, two poly line pitch intervals, or three poly line pitch intervals, apart, based on the size of the cell and the position of the gate electrode in each of the cells being added to an integrated circuit layout. In some embodiments, the gate electrode separation distance (the distance between the first cell gate electrode and the second cell gate electrode) ranges from at least four poly line pitch intervals to not more than ten poly line pitch intervals. Other initial gate electrode separation distances are also envisioned within the scope of the present disclosure.

Figure 5:
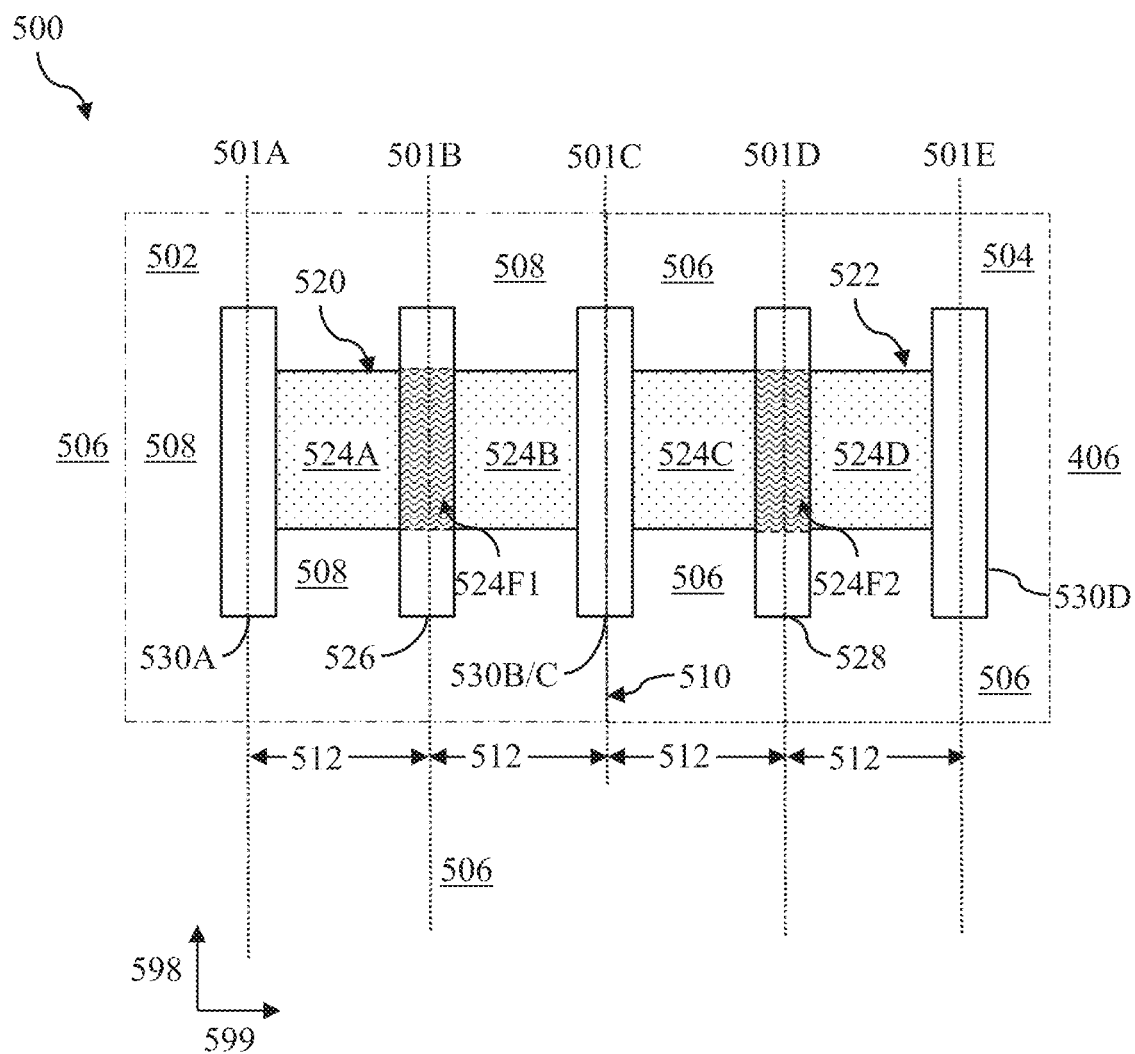
FIG. 5 is a top view of an integrated circuit layout, in accordance with some embodiments.
Figure 6:
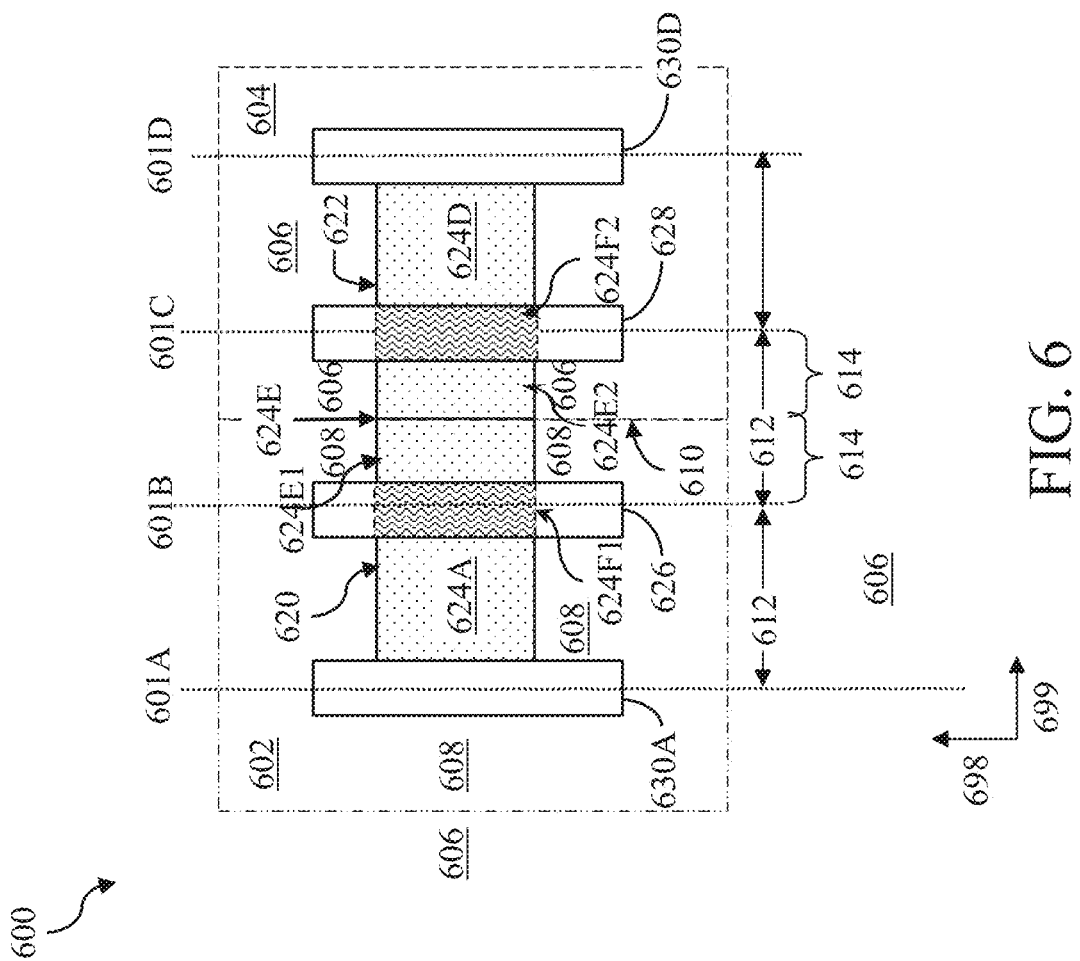
FIG. 6 is a top view of an integrated circuit layout, in accordance with some embodiments.

FIGS. 4 and 7-9 describe some embodiments of an integrated circuit where the gate electrode separation distance is three poly line pitch intervals. FIG. 5 describes some embodiments of an integrated circuit where the gate electrode separation distance is two poly line pitch intervals. FIG. 6 describes some embodiments of an integrated circuit where the gate electrode separation distance is one poly line pitch interval.

According to some embodiments, an integrated circuit with a gate electrode separation distance of three poly line pitch intervals has, in each cell, an outer poly line, a gate electrode poly line, and an inner poly line. Inner poly lines of a pair of cells are poly lines that are located between the gate electrodes of the two cells selected for an integrated circuit layout (see, e.g., FIG. 4, poly line 430B of first cell 402, and poly line 430C of second cell 404). Outer poly lines of a pair of cells are poly lines that are located in the two cells, having the gate electrode poly lines between the outer poly lines (see, e.g., FIG. 4, poly line 430A of first cell 402, and poly line 430D of second cell 404).

According to some embodiments, an integrated circuit with a gate electrode separation distance of two poly line pitch intervals has, in each cell, an outer poly line, a gate electrode poly line, and a portion of a shared inner poly line (or, a shared inner poly line). FIG. 5, below, describes a non-limiting example of an integrated circuit layout 500 wherein the final gate electrode separation distance is two poly line pitch intervals.

According to some embodiments, an integrated circuit with a gate electrode separation distance of one poly line pitch interval has, in each cell, an outer poly line, and a gate electrode poly line, with no poly lines between the first cell gate electrode and the second cell gate electrode. FIG. 6, below, describes a non-limiting example of an integrated circuit layout 600 wherein the final gate electrode separation distance is one poly line pitch interval.

In some embodiments, the gate electrode separation distance is related to simulated leakage current between active areas of the selected first and second cells of the integrated circuit, as described in operation 303, above.

Figure 4:
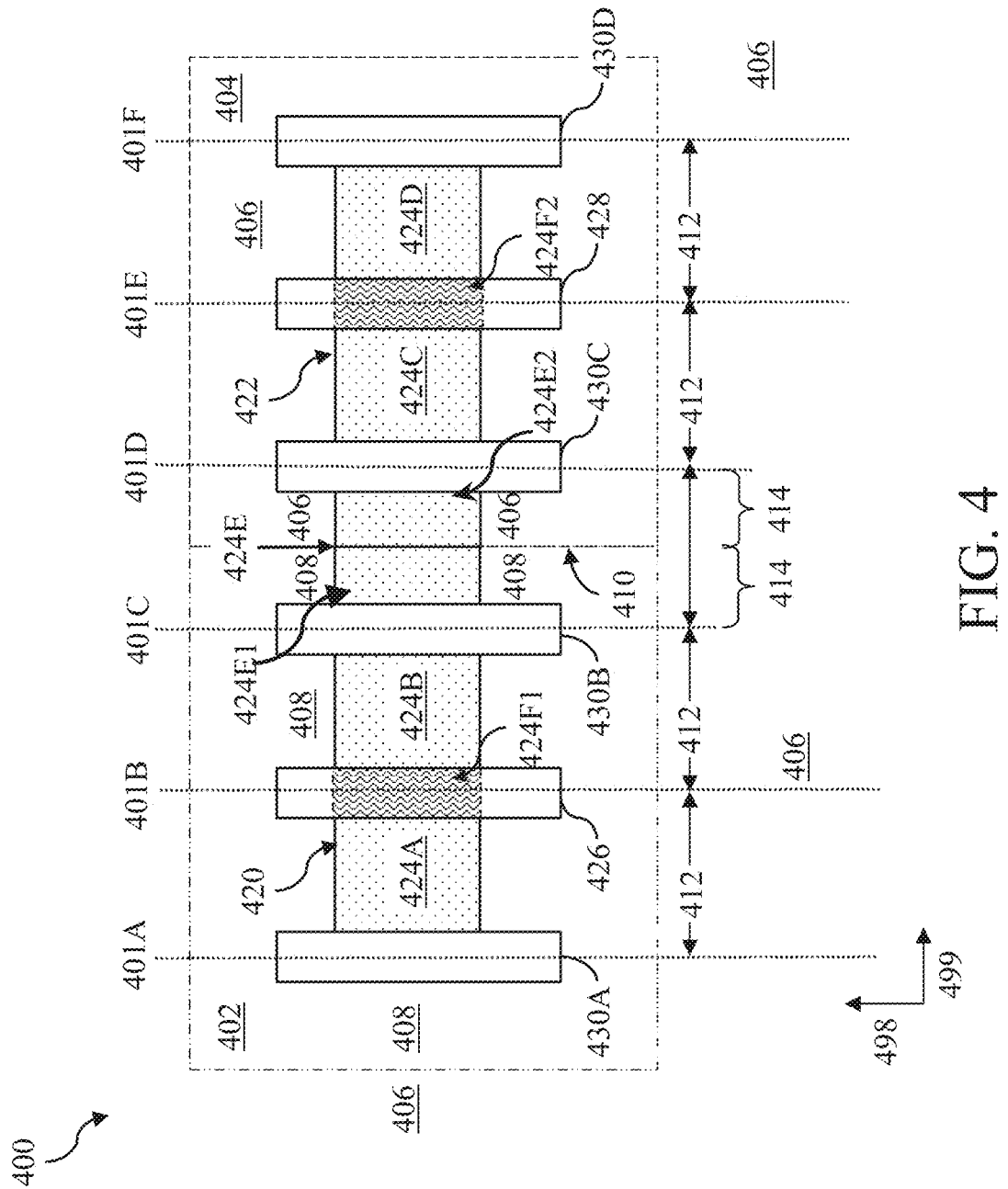
FIG. 4 is a top view of an integrated circuit layout, in accordance with some embodiments.

In some embodiments, the gate electrode separation distance is determined based on the separation between the outer poly lines of the first cell and the second cell (see, e.g., first outer poly line separation distance, or third separation distance 436, and second outer poly line separation distance, or fourth separation distance 438 of FIG. 4).

Upon selecting the gate electrode separation distance, the method proceeds to an operation 312, wherein the border region of a single cell layout is cut or truncated to bring the active area of the cell to the cell border.

In an operation 312, the border region of at least one cell being added to an integrated circuit layout is cut or truncated. The border region is either a well or a buffer region of a cell. The border region of a cell is cut such that the fins of the active area are perpendicular to the cut or truncated edge of the cell and the active area of the cell is "exposed" at the cell border after the cut or truncation is performed. Upon completion of the operation 312, the method continues to operation 314.

In operation 314, the fins of the first cell and the second cell are aligned with each other in order to correspond to the final integrated circuit layout. Aligning fins of the first cell and the second cell includes arranging the first cell and the second cell so that the active areas of each cell are adjacent to each other or connected at the cell border between the first cell and the second cell. Aligning the fins of the first cell and the second cell reduces the complexity of developing photomasks for transferring a pattern corresponding to the fins (e.g., during a photolithography step). Fin alignment is determined by comparing a position, in the first direction, of a centerline of each fin in the first cell to a position, in the first direction, of a centerline of each fin in the second cell. Fin alignment is found when the centerline of a fin in the first cell is [1] parallel to a centerline of a corresponding fin in the second cell, and [2] offset not more than ¼ of a fin width of the fin in the first cell or ¼ of a fin width of a fin in the second cell, from the centerline of the fin in the other cell.

In some embodiments, first cell and second cell have a same number of fins, and each fin in the first cell aligns with each fin of the second cell. In some embodiments, one of the first cell and the second cell has a smaller number of fins than the other of the first cell and the second cell, and each fin of the cell having a smaller number of fins aligns with a fin of the other cell, while at least one fin in the cell having the larger number of fins truncates at a cell boundary between the cells. Aligning the fins of the first cell and the second cell reduces the complexity of etching the fins without causing harm or damage to the cell, and without having a variety of fin widths along a single fin, or multiple fins. Fins with a single width are easier to manufacture.

In an operation 316, the integrated circuit is manufactured according to layers or elements of the integrated circuit layout prepared according to the operations described above in Method 300. Manufacturing an integrated circuit includes saving the instructions (computer operation code) for an integrated circuit layout to a storage medium and accessing the instructions for the layout through an integrated circuit manufacturing process.

FIG. 4 is a diagram of an integrated circuit layout 400, in accordance with some embodiments. Integrated circuit layout 400 includes a first cell 402 and a second cell 404. First cell 402 and second cell 404 are include a substrate 406 of an integrated circuit.

First cell 402 includes a well 408 (as part of the border region of the first cell) in the substrate 406, wherein the well 408 has an opposite dopant type from the first type of dopant in the substrate 406. Well 408 extends into the substrate 406 and surrounds the other elements of first cell 402. A cell boundary 410 between first cell 402 and second cell 404 is demarked by the edge of well 408 closest to second cell 404.

First cell 402 includes a first cell active area 420 and second cell 404 includes second cell active area 422. In some embodiments, first cell active area 420 includes at least one fin of a semiconductor material, and second cell active area 422 includes at least one fin of a semiconductor material. In some embodiments, fins of semiconductor material in active areas of a cell such as first cell 420 and second cell active area 422 are etched from the substrate on which the integrated circuit is being manufactured. First cell active area 420 and second cell active area 422 are contiguous active areas, where the active area of each cell is in direct contact with the active area of the other cell.

In some embodiments, contiguous active areas include fins of semiconductor material that extend from across a portion of a first cell, across a cell boundary, and across a portion of a second cell. For example, first cell active area 420 extends across a portion of first cell 402, across a cell boundary 410, and joins with second cell active area 422 without a break between the active areas. In first cell 402, active area region 424A is a drain region of integrated circuit layout 400, active area region 424B is a source region of integrated circuit layout 400, and active area region 424F1 is a channel region below first cell gate electrode 426. In second cell 404, active area region 424C is a source region, active area region 424D is a drain region, and active area region 424F2 is a channel region below second cell gate electrode 428. In integrated circuit 400, source regions (active area regions 424B and 424C) are closer to each other than drain regions (active area regions 424A and 424D). In some embodiments, drain regions are closer to each other than source regions.

Active area region 424E is an active area buffer region, acting as neither a source region, a drain region, nor a channel region. A buffer region of an active area is a portion of the active area that separates source regions (or, in some embodiments, drain regions) from each other to preserve functionality of the cells of the integrated circuit. Functionality of cells of an integrated circuit is preserved by reducing current leakage between cells of the integrated circuit, such that power consumption is maintained at low levels, battery life for portable semiconductor devices is increased, and that cells operate independently, rather than have current from a source in one cell arrive at a drain in an adjacent cell, triggering a false logic signal from the transistor regions of the integrated circuit.

Active area buffer region 424E is divided into two sub-regions: active area sub-region 424E1, in first cell 402, and active area sub-region 424E2, in second cell 404. Active area sub-region 424E1 is surrounded in first cell 402 by well 408 (see also FIGS. 2A and 2B, first cell 202), by active area region 424B, and in second cell by active area sub-region 424E2. Active area sub-region 424E2 is bounded in second cell by substrate 406, by active area region 424C, and (in first cell) active area sub-region 424E1. In integrated circuit layout 400, substrate 406, well 408, and active area region 424E (e.g., active area sub-regions 424E1 and 424E2) meet at cell boundary 410 described by the edge of the well 408.

First cell gate electrode 426 and second cell gate electrode 428 are poly lines formed by depositing a blanket polysilicon layer over active areas 420 and 422 of the first and second cells and etching the blanket polysilicon layer to leave behind conductive lines to trigger current flow through active area region 424F1 of first cell 402, and active area region 424F2 of second cell 404. In some embodiments, other conductive materials, such as nanowires, or other suitably conductive strands, are used to trigger current flow through channel regions of cells in the integrated circuit layout. Poly lines extending across first cell active area 420 and second cell active area 422 are separated from each other by integer multiples of a poly line pitch interval. A poly line pitch interval is a separation distance between adjacent poly lines (or other conductive lines) in a cell of the integrated circuit.

First cell 402 and second cell 404 include poly lines for the source and drain connections, and for gate electrodes. Poly lines, including gate electrodes and source/drain connection poly lines as described herein, are located at poly line track locations (poly line tracks, or track locations). In integrated circuit layout 400, first cell gate electrode 426 is located at track location 401B, and second cell gate electrode 428 is located at track location 401E. First cell 402 contains poly line 430A at track location 401A, first cell gate electrode 426 at track location 401B, and poly line 430B at track location 401C. Second cell 404 contains poly line 430C at track location 401D, second cell gate electrode 428 at track location 401E, and poly line 430D at track location 401F. Poly lines at track locations 401C and 401D are "inner" poly lines, because the poly lines are closest, in the cells where the poly lines are located, to the gate electrode of the other cell. Conversely, the poly lines at track locations 401A and 401F are "outer" poly lines because the poly lines are located farthest, in the cells where the poly lines are located, from the gate electrode of the other cell.

Each track location of track locations 401A-401I is separated by one poly line pitch interval 412 from an adjacent track location of track locations 401A-401I. Cell boundary 410 is a half pitch interval 414 separated from track location 401C and track location 401D. In some embodiments, the border between a first cell, with a well, and a second cell, without a well, is between adjacent track locations, but not at a middle position between the track locations (e.g., not at the half pitch interval between track locations).

In some embodiments, an integrated circuit substrate is a semiconductor material such as a type IV semiconductor material (e.g., intrinsic silicon) a binary type IV semiconductor material (e.g., silicon germanium (SiGe), and so forth), a type III-V semiconductor (e.g., gallium arsenide (GaAs)), or another substrate used for making integrated circuits. In some embodiments, the semiconductor material is a doped semiconductor material, having a first type of dopant. In some embodiments, the first type of dopant is a P-type dopant. In some embodiments, the first type of dopant is an N-type dopant.

FIG. 5 is a top view of an integrated circuit layout 500, in accordance with some embodiments. Elements of integrated circuit layout 500 that correspond to elements of integrated circuit layout 400 have a same reference numeral, incremented by 100. Integrated circuit layout 500 has a first cell 502 and second cell 504, where the first cell gate electrode 526 and the second cell gate electrode 528 are separated by two poly line pitch intervals 512. Poly line 530B/C is a shared poly line, located at cell boundary 510 between first cell 502 and second cell 504 (e.g., cell boundary 510 extends in the first direction through poly line 530B/C). Source/drain region 524B and source/drain region 524C are a first type (source or drain) of region, and source/drain region 524A and source/drain region 524D are a second type of region. In some embodiments, the first type of region is a source region. In some embodiments, the first type of region is a drain region.

Source/drain regions 524A-524D are configured to receive contacts from a layer of the integrated circuit above the active area in order to perform logic functions using the integrated circuit. In some embodiments, poly lines 530A-530D are removed from over active areas 520 and 522 in order to provide additional space for contacts to source/drain regions 524A-524D. Gate electrodes 526 and 528 remain above channel areas 524F1 and 524F2 to switch the transistors in active areas 520 and 522 on and off during operation of the integrated circuit. Well 508 laterally bounds active area 520 in the first direction 598 and second direction 599, except where first cell 502 meets second cell 504 at cell boundary 510.

FIG. 6 is a top view of an integrated circuit layout 600, in accordance with some embodiments. Elements of integrated circuit layout 600 that correspond to elements of integrated circuit layout 400 have a same reference numeral, incremented by 200. Integrated circuit layout 600 has a first cell 602 and second cell 604, where the first cell gate electrode 626 and the second cell gate electrode 628 are separated by one poly line pitch interval 612. Integrated circuit layout 600 does not include an inner poly line. Source/drain region 624E is a shared region between first cell gate electrode 626 and second cell gate electrode 628. A first portion 624E1 of source/drain region 624E is in first cell 602, and a second portion 624E2 of source/drain region 624E is in second cell 604. First portion 624E1 and second portion 624E2 meet at cell boundary 610 between first cell 602 and second cell 604. Source/drain region 624A and source/drain region 624D are a first type of region, and source/drain region 624E is a second type of region. In some embodiments, the first type of region is a source region. In some embodiments, the first type of region is a drain region.

Source/drain regions 624A, 624D, and 624E are configured to receive contacts from a layer of the integrated circuit above the active area in order to perform logic functions using the integrated circuit. In some embodiments, poly lines 630A and 630D are removed from over active areas 620 and 622 in order to provide additional space for contacts to source/drain regions 624A. 624D, and 624E. First cell gate electrode 626 and second gate electrode 628 remain above channel areas 624F1 and 624F2 to switch the transistors in active areas 620 and 622 on and off during operation of the integrated circuit. Well 608 laterally bounds active area 620 in the first direction 698 and second direction 699, except where first cell 602 meets second cell 604 at cell boundary 610.

Figure 7:
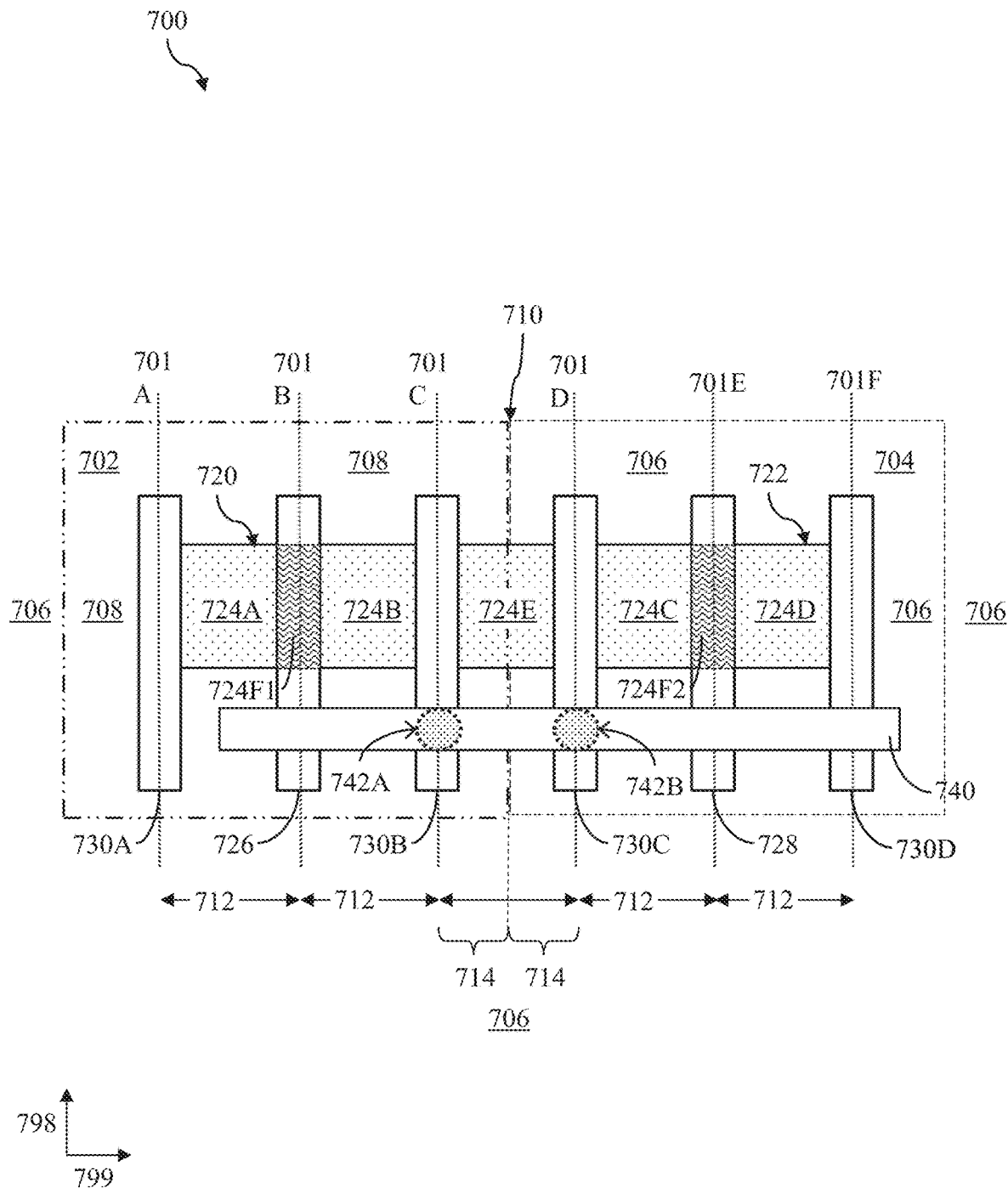
FIG. 7 is a top view of an integrated circuit layout, in accordance with some embodiments.

FIG. 7 is a top view of an integrated circuit layout 700, in accordance with some embodiments. Elements of integrated circuit layout 700 that correspond to elements of integrated circuit layout 400 have a same reference numeral, incremented by 300. In integrated circuit layout 700, inner poly lines 730B and 730C are electrically connected to a power rail 740. Power rail 740 is situated in a layer above first cell 702 and second cell 704. In some embodiments, some portions (not shown) of power rail 740 extend over some of source/drain regions 724A-724E of the first cell 702 and the second cell 704 to accommodate current flow through the active area 720 and/or the active area 722. Contact 742A electrically connects power rail 740 to poly line 730B. Contact 742B electrically connects power rail 740 to poly line 730C. In embodiments of integrated circuit layouts where the simulated leakage current between the active area region 724F1 (e.g., a first cell channel region) and the active area region 724F2 (e.g., a second cell channel region) exceeds a leakage current threshold, the cells selected for an integrated circuit layout are changed to include a structure which isolates the buffer region 724E is from source/drain regions 724B and 724C, and from the active area regions 724F1 and 724F2. A bias transfer structure, or a leakage-current reduction structure, reduces leakage current between the first cell and the second cell by transmitting an electrical potential, through a contact, to a poly line between the gate electrode of a first cell and the gate electrode of a second cell. The transmitted bias repels charge carriers from the cell border (e.g., cell border 710), reducing or eliminating leakage current. In a non-limiting embodiment, source/drain regions 724B and 724C are source regions and source/drain regions 724A and 724D are drain regions, and power rail 740 is a $V_{ss}$ line, such that current flow through buffer region 724E (between track locations 701C and 701D) is discouraged in favor of current flow across active area regions 724F1 and 724F2 during operation of the cells. In some embodiments, the bias is also transmitted during periods when the cells are idle, or non-operational.

Figure 8:
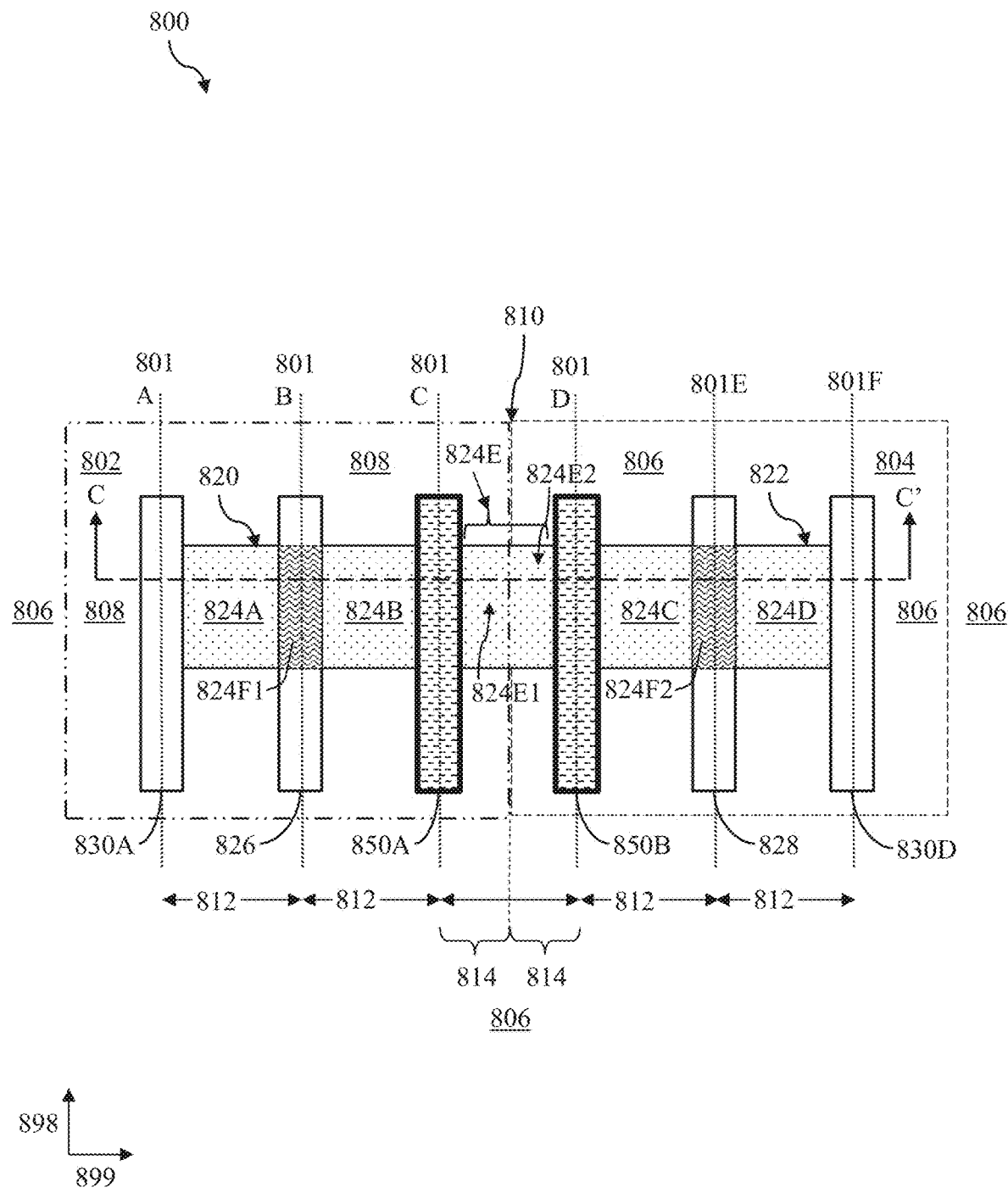
FIG. 8 is a top view of an integrated circuit layout, in accordance with some embodiments.
Figure 9:
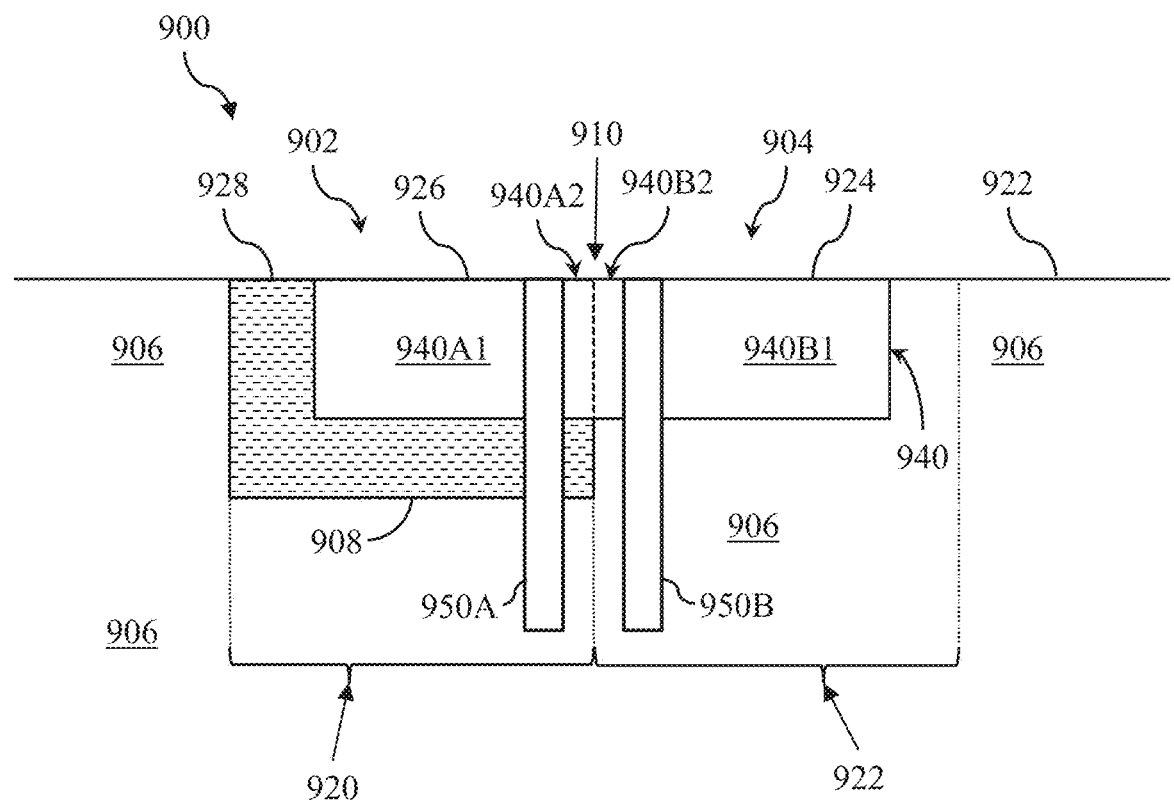
FIG. 9 is a cross-sectional view of an integrated circuit layout, in accordance with some embodiments.
Figure 9:
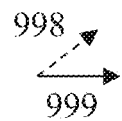

FIG. 8 is a top view of an integrated circuit layout 800, in accordance with some embodiments. Elements of integrated circuit layout 800 that correspond to elements of integrated circuit layout 400 have a same reference numeral, incremented by 400. First cell 802 includes source/drain regions 824A and 824B, and active area region 824F1 (e.g., a first cell channel region). Second cell 804 includes source/drain regions 824C and 824D, and active area region 824F2 (e.g., a second cell channel region). In embodiments of integrated circuit layouts where the leakage current between the active area region 824F1 (e.g., a first cell channel region) and the active area region 824F2 (e.g., a second cell channel region) exceeds a leakage current threshold, the buffer region 824E is electrically isolated from source/drain regions 824B and 824C, and from the active area regions 824F1 and 824F2 with the inclusion of trench isolation structures 850A and 850B. Active area buffer region 824E contains first buffer region portion 824E1 and second buffer region portion 824E2. First buffer region portion 824E1 is the region of the first active area 820 within first cell 802 and between trench isolation structure 850A and trench isolation structure 850B. Second buffer region portion 824E2 is the region of the second cell active area 822 within second cell 804 and between trench isolation structure 850A and trench isolation structure 850B. First buffer region portion 824E1 and second buffer region portion 824E2 share a boundary at cell boundary 810. A cross sectional line C-C' extends through a fin (not shown) of first cell 802 and second cell 804. FIG. 9, below, is a cross-sectional view of a non-limiting embodiment of an integrated circuit 900 having a structure corresponding to the description of integrated circuit layout 800.

Trench isolation structures 850A and 850B are located at track locations 801C and 801D. Trench isolation structure 850A extends through fins and insulating material (not shown) of active area 820, and trench isolation structure 850B extends through fins and insulating material (not shown) of second cell active area 822. Trench isolation structures are formed by etching a trench at track locations (see track locations 801C and 801D) to cut through poly lines over fins, and the fins of the active areas, into the substrate. In first cell active area 802, trench isolation structure 850A extends through well 808 into substrate 806 below first cell active area 820. In some embodiments, a cell with a well has a trench isolation structure extends into the well, but not into the substrate below the well. In some embodiments, the trench isolation structure in a cell with a well and a cell without a well are a same depth. In some embodiments, the trench isolation structure in a cell with a well and a cell without a well have different depths.

In some embodiments, each of the at least one trench isolation structure is located in a single cell of the integrated circuit. In a non-limiting example of an integrated circuit having a single trench isolation structure, the trench isolation structure is located in the first cell and cuts through an entirety of the first cell active area and the first well into the substrate below the first well, a first portion of the first cell active area on one side of the trench isolation structure and a second portion of the first cell active area on an opposite side of the trench isolation structure and in direct contact with the second cell active area at the cell boundary. In a non-limiting example of an integrated circuit having a single trench isolation structure, the trench isolation structure is located in the second cell and cuts through an entirety of the second cell active area and into the substrate below the second cell active area, a first portion of the second cell active area on one side of the trench isolation structure and a second portion of the second cell active area on an opposite side of the trench isolation structure and in direct contact with the first cell active area at the cell boundary. In some embodiments, a single trench isolation structure is located between the first cell active area and the second cell active area along the cell boundary, and the first cell active area and the second cell active area each make contact with an opposite side of the trench isolation structure from the active area of the other cell.

According to some embodiments, a trench isolation structure is formed in a cell of an integrated circuit by depositing a layer of patterning material over an active area of the integrated circuit, and patterning the layer of patterning material to have an opening corresponding to a track location of the cell. The exposed portion of the active area includes, in a third direction extending down from the opening toward the substrate below the opening, at least one fin of an active area of the cell, insulating material next to the at least one fin of the active area, and, in some embodiments, doped well material laterally located next to the at least one fin and insulating material. In some embodiments, the opening in the patterning material further exposes a top surface of the substrate over which the patterning material is deposited. In an operation of a manufacturing process, an etch process is performed to remove a portion of the at least one fin, the insulating material next to the at least one fin, and a portion of the substrate over which the patterning material is deposited and containing the at least one fin and neighboring insulating material. In some embodiments of a cell having a doped well, the etch process is configured to remove the doped well material in addition to the fin material, insulating material, and substrate material. In some embodiments of the manufacturing process, the etch process is a multi-step etch process configured to change etch chemistry, plasma pressure, bias voltage, substrate temperature, or other parameters of the etch process to regulate the removal of material in the substrate and form an opening in the substrate having straight sidewalls and sufficient depth to electrically isolate fin material on one side of the trench isolation structure from fin material on the other side of the trench isolation structure.

In some embodiments of the manufacturing process, the patterning material is removed from the top surface of the integrated circuit layer, and the trench isolation openings formed by the etch process are filled with a deposited material. In some embodiments, the deposited material is a dielectric material such as silicon dioxide, silicon nitride, or silicon oxy-nitride. In some embodiments, the deposited material is a semiconductor material such as polysilicon, or a semiconductor material similar in composition to the composition of the substrate in which the integrated circuit cells are formed. In some embodiments, multiple layers of deposited material are added to the trench isolation openings. In some embodiments, layers of semiconductor material and insulating material are alternatingly deposited into the trench isolation openings to form a capacitive structure. In some embodiments, the trench isolation structures are electrically connected to a ground or power rail of the integrate circuit in order to modify the electrical field of the substrate between gates or channels of the adjoining cells to reduce leakage current between the cells.

FIG. 9 is a cross-sectional view of an integrated circuit 900, in accordance with some embodiments. Integrated circuit 900 corresponds to the structure of integrated circuit layout 800 of FIG. 8. Integrated circuit 900 includes a first cell 902 and a second cell 904. First cell includes a well 908 bounded laterally by substrate 906. Well 908 extends below first cell active area 920. First cell 902 and second cell 904 meet at cell boundary 910. First cell 902 includes a trench isolation structure 950A and second cell 904 includes a trench isolation structure 950B, trench isolation structure 950A extends down from top surface 926 of fin 940 in first cell 902, and down from top surface 928 of well 908, through an entirety of fin 940 and an entirety of well 908. Trench isolation structure 950A divides fin 940 into first fin portion 940A1 and second fin portion 940A2 within first cell 902. Trench isolation structure 950B extends down from top surface 924 of fin 940 and top surface 927 of substrate 906 in second cell 904. Trench isolation structure 950B divides fin 940 into third fin portion 940B1 and fourth fin portion 940B2 within second cell 904. Top surfaces 924, 926, 927, and 928 are substantially planar with respect to each other.

Figure 10:
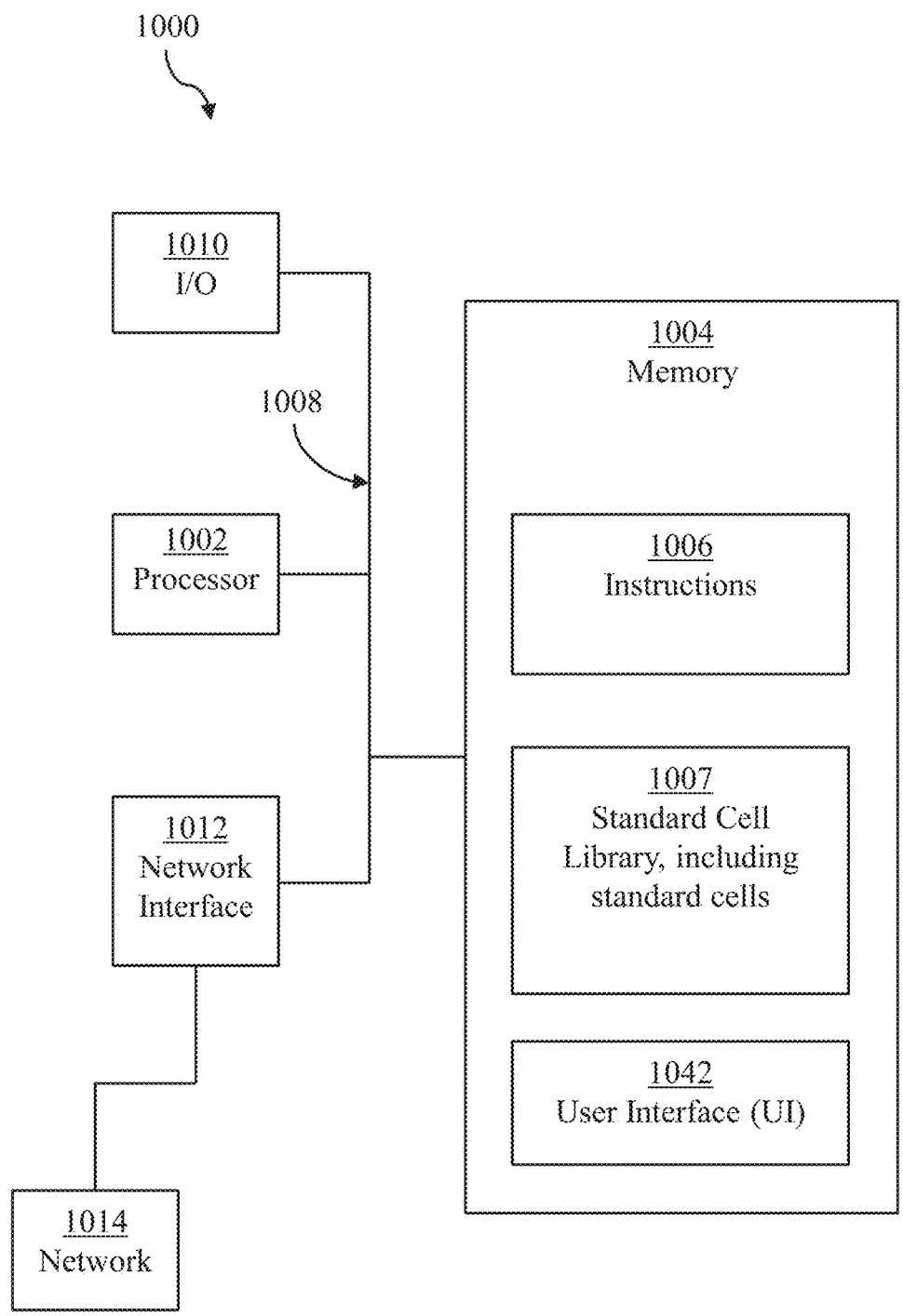
FIG. 10 is a block diagram of an electronic design automation (EDA) system, in accordance with some embodiments.

FIG. 10 is a block diagram of an electronic design automation (EDA) system 1000 in accordance with some embodiments.

In some embodiments, EDA system 1000 is a general purpose computing device including a hardware processor 1002 and a non-transitory, computer-readable storage medium 1004. Storage medium 1004, amongst other things, is encoded with, i.e., stores, computer program code 1006. i.e., a set of executable instructions. Execution of computer program code 1006 by hardware processor 1002 represents (at least in part) an EDA tool which implements a portion or all of, e.g., the methods described herein in accordance with one or more (hereinafter, the noted processes and/or methods).

Processor 1002 is electrically coupled to computer-readable storage medium 1004 via a bus 1008. Processor 1002 is also electrically coupled to an I/O interface 1010 by bus 1008. A network interface 1012 is also electrically connected to processor 1002 via bus 1008. Network interface 1012 is connected to a network 1014, so that processor 1002 and computer-readable storage medium 1004 are capable of connecting to external elements via network 1014. Processor 1002 is configured to execute computer program code 1006 encoded in computer-readable storage medium 1004 in order to cause EDA system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause EDA system 1000 (where such execution represents (at least in part) the EDA tool) to be usable for performing a portion or all of the noted processes and/or methods. In one or more embodiments, storage medium 1004 also stores information which facilitates performing a portion or all of the noted processes and/or methods. In one or more embodiments, storage medium 1004 stores a library 1007 of standard cells including such standard cells as disclosed herein.

EDA system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

EDA system 1000 also includes network interface 1012 coupled to processor 1002. Network interface 1012 allows EDA system 1000 to communicate with network 1014, to which one or more other computer systems are connected. Network interface 1012 includes wireless network interfaces such as BLUETOOTH. WIFI, WIMAX. GPRS, or WCDMA; or wired network interfaces such as ETHERNET, USB, or IEEE-1364. In one or more embodiments, a portion or all of noted processes and/or methods, is implemented in two or more EDA systems 1000.

EDA system 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. EDA system 1000 is configured to receive information related to a UI through I/O interface 1010. The information is stored in computer-readable medium 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1000. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit. e.g., one or more of an optical disk, such as a DVD, a magnetic disk, such as a hard disk, a semiconductor memory, such as a ROM, a RAM, a memory card, and the like.

Figure 11:
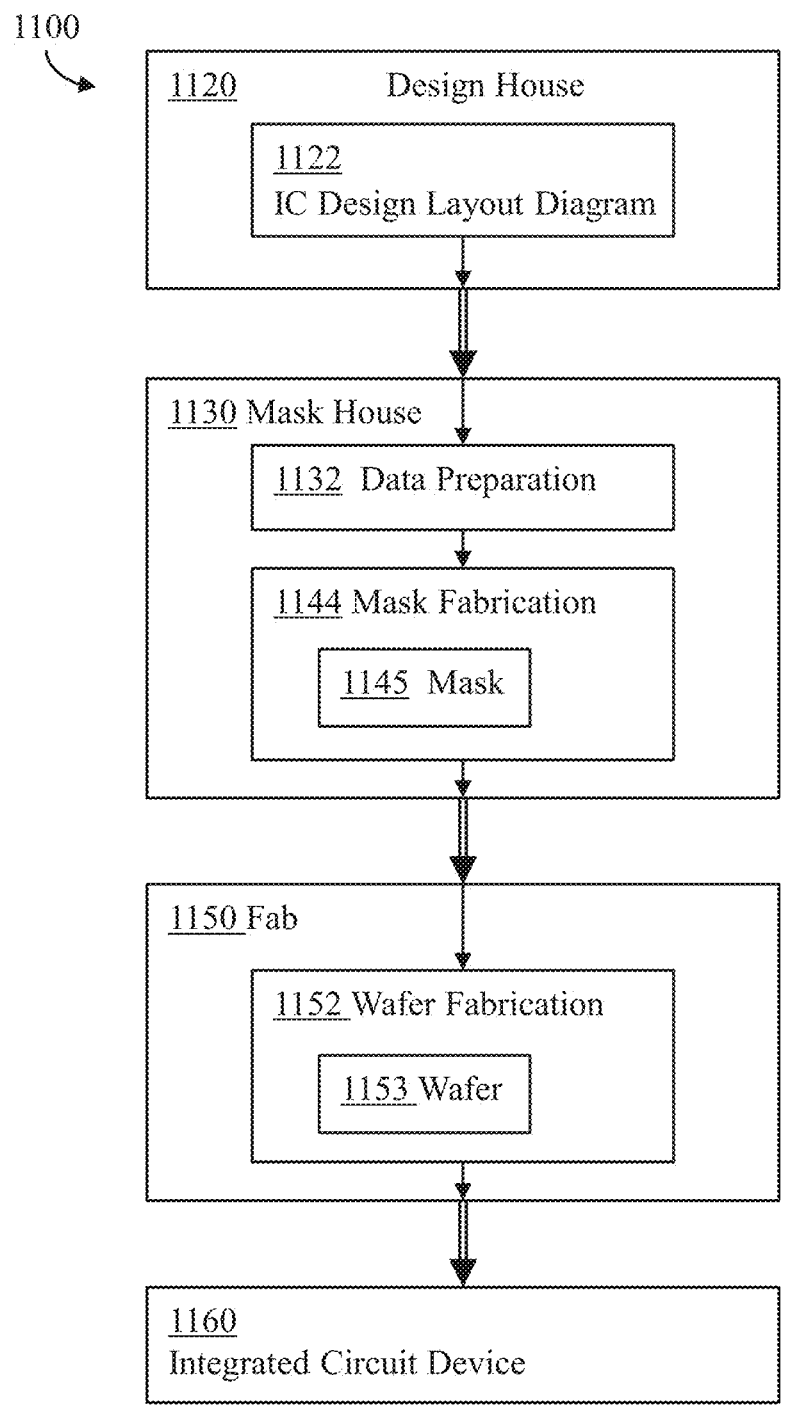
FIG. 11 is a block diagram of an integrated circuit manufacturing system and an integrated circuit manufacturing flow associated therewith, in accordance with some embodiments.

FIG. 11 is a block diagram of an integrated circuit manufacturing system 1100 and an integrated circuit manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1100.

In FIG. 11, manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in manufacturing system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns designed for an IC device 1160. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file ("RDF"). Mask data preparation 1132 provides the RDF to mask fabrication 1144. Mask fabrication 1144 includes a mask writer. A mask writer converts the RDF to an image on a substrate, such as a mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1122.

It should be understood that the above description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 includes wafer fabrication 1152. IC fab 1150 is an IC fabrication business that includes one or more manufacturing facilities for the fabrication of a variety of different IC products. In some embodiments. IC Fab 1150 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multilevel interconnects, and the like (formed at subsequent manufacturing steps).

An integrated circuit as disclosed herein includes a modified or reduced spacing between gate electrodes of adjacent cells in the integrated circuit, such that the amount of buffer space or isolating space between active areas is reduced or eliminated and the active area of one cell is indirect contact with the active area of the adjacent cell. The active areas include fins which extend continuously across a cell boundary between the cells.

Aspects of the present disclosure relate to a method of making an integrated circuit, which includes operations of selecting a first cell and a second cell for an integrated circuit layout from a cell library in an electronic design automation (EDA) system, wherein the first cell has a first cell active area, a first gate electrode, at least one fin of a first set of fins, and a first cell border region, the first cell active area having a first exposed side, and the second cell has a second cell active area, a second gate electrode, at least one fin of a second set of fins, and a second cell border region, the second cell active area having a second exposed side; and placing the first exposed side against the second exposed side at a cell border. The method also includes operations of aligning at least one fin of the first set of fins with at least one fin of the second set of fins. In some embodiments, the method further comprises manufacturing the integrated circuit based on an integrated circuit layout having the selected first cell and the selected second cell. In some embodiments, the method further comprises simulating an electrical parameter of the first cell and the second cell using the EDA system and selecting a type of leakage current reduction structure for a cell based on the summated electrical parameter of the first cell and the second cell. In some embodiments, based on a selection of a type of leakage current reduction structure, selecting the first cell and/or the second cell further comprises selecting a cell from the cell library having a trench isolation structure therein between the cell border and the first gate electrode and/or the second gate electrode. In some embodiments, modifying the layout further comprises aligning a first cell fin portion with a second cell fin portion to make a fin extending across a cell boundary between the first cell and the second cell. In some embodiments, based on the selection of a type of leakage current reduction structure, selecting the first cell and/or the second cell further comprises selecting a cell from the cell library having a poly line over at a set of fins in a cell between the cell border and a cell gate electrode, the poly line being electrically connected to a voltage source of the integrated circuit. In some embodiments, the method includes selecting the second separation distance further comprises setting the second separation distance of at least one poly line pitch interval and not more than four poly line pitch intervals.

Aspects of the present disclosure relate to an integrated circuit, which includes a first cell having a well in a substrate, a first cell active area in the well, and a first gate electrode extending over the first cell active area; and a second cell having a second cell active area in the substrate, and a second gate electrode extending over the second cell active area, where the first cell active area and the second cell active area meet at a cell boundary. In some embodiments of the integrated circuit, the first cell active area includes a first fin portion, the second cell active area includes a second fin portion, and the first fin portion and the second fin portion are a continuous fin across the cell boundary. In some embodiments of the integrated circuit, the first gate electrode and the second gate electrode are separated by a gate separation distance of at least one poly line pitch interval and not more than four poly line pitch intervals. In some embodiments of the integrated circuit, a first trench isolation structure which truncates the first fin portion into two pieces within the first cell. In some embodiments of the integrated circuit, a second trench isolation structure which truncates the second fin portion into two pieces within the second cell. In some embodiments of the integrated circuit, at least one of the first fin portion and the second fin portion is covered by a poly line electrically connected to a voltage source of the integrated circuit. In some embodiments of the integrated circuit, the voltage source is a Vss power rail of the integrated circuit. In some embodiments of the integrated circuit, the voltage source is a Vdd rail of the integrated circuit. In some embodiments of the integrated circuit, the first gate electrode and the second gate electrode are separated by three poly line pitch intervals, there being a first poly line over the first fin portion and a second poly line over the second fin portion between the first gate electrode and the second gate electrode, the first fin portion and the first fin portion extends continuously into the second fin portion across a cell boundary.

Aspects of the present disclosure relate to an integrated circuit which includes a first cell having an N-well, and a first cell active area with a first gate electrode and a first cell drain region; and a second cell having a second cell active area with a second gate electrode and a second cell drain region, and a shared source region between the first gate electrode and the second gate electrode, a cell boundary of the first cell and the second cell extending through the shared source region. In some embodiments of the integrated circuit, the first gate electrode is between the first cell drain region and the cell boundary, and the second gate electrode is between the second cell drain region and the cell boundary, and the first gate electrode and the second gate electrode are separated by one poly line pitch interval. In some embodiments of the integrated circuit, the first cell have a first number of fins in the first cell active area, the second cell has a second number of fins in the second cell active area, and the first number of fins is the same as the second number of fins. In some embodiments of the integrated circuit, the first cell have a first number of fins in the first cell active area, the second cell has a second number of fins in the second cell active area, and the first number of fins is the different from the second number of fins. In some embodiments of the integrated circuit, all but one fin of the first number of fins in the first cell active area aligns with the fins of the second number of fins of the second cell active area, and all fins of the second cell extend across the cell boundary.

The foregoing outlines features of some embodiments so that those skilled in the art may better understand the aspects of the present disclosure. Those skilled in the art should appreciate that the present disclosure as serves as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of making an integrated circuit, comprising:
selecting a first cell and a second cell for an integrated circuit layout from a cell library in an electronic design automation (EDA) system, wherein
the first cell has a first cell active area, a first gate electrode, first set of fins, and a first cell border region, the first cell active area having a first exposed side, and
the second cell has a second cell active area, a second gate electrode, a second set of fins, and a second cell border region, the second cell active area having a second exposed side;
placing the first exposed side against the second exposed side to define a cell boundary; and
aligning at least a first fin of the first set of fins with a second fin of the second set of fins, wherein a number of fins in the first set of fins is different from a number of fins in the second set of fins.

2. The method of claim 1, further comprising manufacturing the integrated circuit based on an integrated circuit layout comprising the selected first cell and the selected second cell.

3. The method of claim 2, further comprising
simulating an electrical parameter of the first cell and the second cell using the EDA system; and
selecting a leakage current reduction structure for at least one of the first cell and second cell based on the simulated electrical parameter of the first cell and the second cell; and
simulating the electrical parameter of the first cell and the second cell with the selected leakage current reduction structure applied.

4. The method of claim 3, wherein, based on the selection the leakage current reduction structure, the operation of selecting at least one of the first cell and the second cell further comprises:
selecting at least one alternative cell from the cell library, wherein the alternative cell comprises a shallow trench isolation (STI) structure arranged between a first gate electrode and a first cell border region of a first alternative cell or a second gate electrode and a second cell border region of a second alternative cell.

5. The method of claim 1, further comprises:
modifying the integrated circuit layout further comprises:
aligning a first cell fin portion with a second cell fin portion to make a continuous fin extending across the cell boundary between the first cell and the second cell.

6. The method of claim 3, wherein, based on the selection of a type of leakage current reduction structure, further comprising:
selecting at least one of
a first cell configuration comprising a first set of fins and a first poly line extending over the first set of fins, the poly line being positioned between the first gate electrode and the first cell border region and
a second cell configuration comprising a second set of fins and a second poly line extending over the second set of fins, the second poly line being positioned between the second gate electrode and the second cell border region; and
connecting at least one of the first poly line and the second poly line to a voltage source of the integrated circuit.

7. A method of making an integrated circuit, comprising:
forming a first cell, wherein forming the first cell comprises:
forming a first well in a semiconductor substrate;
forming a first cell active area in the first well; and
forming a first gate electrode extending over the first cell active area; and
forming a second cell, wherein forming the second cell comprises:

forming a second cell active area in the semiconductor substrate outside of the first well;

forming a second gate electrode extending over the second cell active area, wherein the first cell active area and the second cell active area meet at a cell boundary; and forming a continuous fin structure across the cell boundary, wherein the continuous fin structure comprises a first fin portion across the first cell active area and a second fin portion across the second cell active area.

8. The method according to claim 7, further comprising:
forming a plurality of continuous fin structures extending across the cell boundary, wherein each of the continuous fin structures comprises a first fin portion across the first cell active area and a second fin portion across the second cell active area.

9. The method according to claim 7, further comprising:
positioning the first gate electrode relative to the second gate electrode to establish a gate separation distance of at least one poly line pitch interval and not more than four poly line pitch intervals.

10. The method according to claim 8, further comprising:
forming a first trench isolation structure which separates the first fin portion into a first region and a second region within the first cell.

11. The method according to claim 8, further comprising:
forming a second trench isolation structure which separates the second fin portion into a first region and a second region within the second cell.

12. The method according to claim 8, further comprising:
forming a conductive structure over at least one of the first fin portion and the second fin portion;
connecting the conductive structure to a voltage source.

13. The method according to claim 12, further comprising:
connecting the conductive structure to a $V_{SS}$ power rail.

14. The method according to claim 12, further comprising:
connecting the conductive structure to a $V_{DD}$ power rail.

15. The method according to claim 8, further comprising:
positioning the first gate electrode relative to the second gate electrode to establish a gate separation distance of three poly line pitch intervals;
forming a first conductive line over the first fin portion between the first gate electrode and the second gate electrode; and
forming a second conductive line over the second fin portion between the first gate electrode and the second gate electrode.

16. A method of making an integrated circuit, comprising forming an N-well in a semiconductor substrate;

forming a first cell in the N-well, the first cell comprising a first cell active area with a first gate electrode and a first cell drain region;

forming a second cell in the semiconductor substrate, the second cell comprising a second cell active area with a second gate electrode and a second cell drain region, wherein the first cell and the second cell abut along a cell boundary;

forming a shared source region between the first gate electrode and the second gate electrode, wherein the cell boundary extends through the shared source region;

forming a first plurality of N fins in the first cell active area; and forming a second plurality of M fins in the second cell active area, wherein N and M satisfy an expression (II)

$$N \neq M \qquad (II).$$

17. The method according to claim 16, further comprising:
positioning the first gate electrode relative to the second gate electrode to establish a gate separation distance of one poly line pitch interval.

18. The method according to claim 16, further comprising:
forming a first plurality of N fins in the first cell active area; and
forming a second plurality of M fins in the second cell active area, wherein N and M satisfy an expression (I)

$$N = M \qquad (I).$$

19. The method according to claim 16, wherein forming the second cell in the semiconductor substrate comprises forming the second cell outside of the N-well.

20. The method according to claim 16, further comprising:
aligning a first subset of $N_s$ fins of the first plurality of N fins with a second subset of $M_s$ fins of the second plurality of M fins in the second cell active area,
wherein the aligned first subset of $N_s$ fins and second subset of $M_s$ fins form a set of C continuous fins extending across the cell boundary from the first cell active area to the second cell active area, wherein, N, M, and C satisfy an expression (III)

$$N \neq C \qquad (III).$$

* * * * *